United States Patent [19]

Nozaki et al.

[11] 4,186,416

[45] Jan. 29, 1980

[54] RECORD READING DEVICE FOR MAGNETIZED TAGS

[76] Inventors: Tatsuzo Nozaki, 22-2 Setogawa-cho, Saga Tenryuji, Ukyo-ku, Kyoto City; Yoshihisa Ogawa, 18-28, Kawarakubo, Imazato, Nagaokakyo City, Kyoto Prefecture, both of Japan

[21] Appl. No.: 884,185

[22] Filed: Mar. 7, 1978

[51] Int. Cl.² ............. G11B 21/18; G06K 7/08; G11B 25/04
[52] U.S. Cl. ............. 360/107; 235/449; 235/482; 360/2
[58] Field of Search ............. 235/449, 482, 483, 486; 360/104, 107, 2

[56] References Cited

U.S. PATENT DOCUMENTS

| | | | |
|---|---|---|---|
| 3,146,455 | 8/1964 | Cutia et al. | 360/2 |
| 3,472,970 | 10/1969 | Basseches | 360/107 |

*Primary Examiner*—Daryl W. Cook
*Attorney, Agent, or Firm*—Wenderoth, Lind & Ponack

[57] ABSTRACT

A hand type record reading device for magnetized tags includes a fixed member, a moving member capable of movement toward and away from the fixed member while being parallelly aligned with respect thereto, and a tag supporting member fixed to the fixed member. The moving member has plural reading heads adjustable in position according to the thickness of the tag placed on the supporting member, as well as to the position of plural magnetically recorded portion of the tag.

2 Claims, 2 Drawing Figures

RECORD READING DEVICE FOR MAGNETIZED TAGS

BACKGROUND OF THE INVENTION

The present invention relates to a hand type record reading device for price-tickets, labels, etc. (hereunder called "tags") having magnetized faces on which various contents are recorded by means of magnetic variations thereof.

Reading of contents recorded by means of magnetic variation of the magnetized faces of tags has hitherto been done by manually scanning a reading head (usually called "scan") along on the magnetized faces of the tags and by having such reading head directly coupled to a cassette tape, etc.

However, the conventional method of reading has the disadvantage that as the reading head is scanned manually along on the magnetized faces of the tags, scanning frequently happens to be incomplete in covering the entire magnetized faces, thus resulting in an imperfect reading of the contents of the tags.

Further, in recent years, there have appeared tags having magnetized faces arranged in two or three rows to provide for increased storage of information. If these tags are read by the conventional reading method, the chance of obtaining an imperfect reading will be increased.

SUMMARY OF THE INVENTION

The present invention has been devised in view of the above mentioned disadvantages, and the object of the invention is to offer a record reading device for magnetized tags capable of achieving perfect reading by simple operation by hand.

The reading device of the invention also provides a tag record reading device capable of achieving perfect reading by a single scanning operation, even with tags having magnetized faces arranged in two or three rows.

BRIEF DESCRIPTION OF THE DRAWINGS

The invention is disclosed hereunder with reference to one embodiment thereof illustrated by the accompanying drawings in which.

DETAILED DESCRIPTION OF THE INVENTION

Figure 1:
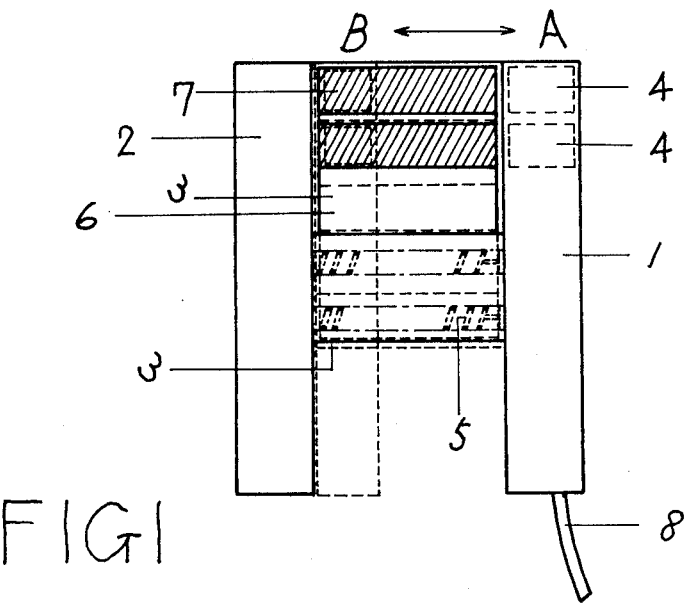
FIG. 1 is a front view of one embodiment of the present invention.
Figure 2:
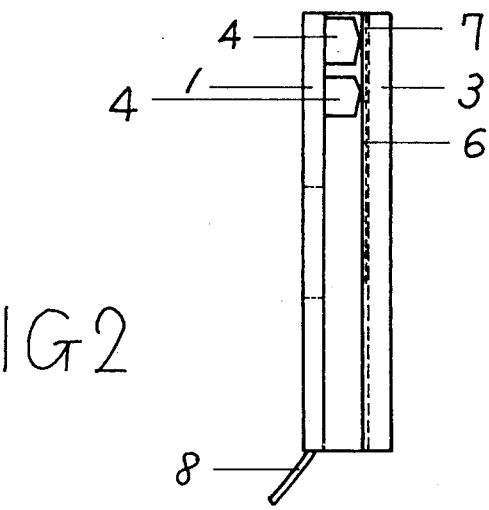
FIG. 2 is a view from the right hand side of FIG. 1.

The numerals of the drawings indicate the principal parts of the device of the invention as follows:

1: Moving member; 2: Fixed member;
3: Tag supporting member; 4: Reading head;
5: Spring; 6: Tag;
7: Magnetized face.

The tag record reading device according to the present invention includes a moving member 1, a fixed member 2 and a tag supporting member 3. These members are so constructed that the moving member 1 has one or a plurality of reading heads 4 provided thereon and is normally positioned symmetrically with respect to fixed member 2. Springs 5 connect members 1 and 2 with each other. The tag supporting member 3 is so arranged as to extend between the moving member 1 and the fixed member 2 when the moving member 1 is in its normal position A.

The reading head 4 on the moving member 1 is so positioned to be directed towards the tag supporting member 3 at an end thereof, with a gap having a thickness equal to that of the tag 6 between heads 4 and the tag supporting member 3. Such gap is readily adjustable by flexible up-and-down movement of the moving member 1. Further, the reading head 4 is arranged to be capable of changing its position to correspond to a respective magnetized face 7 of the tag 6. A lead-wire 8 extends from the reading heads 4.

The operation of the tag record reading device of the invention will be explained hereunder based on the above described construction of the device. Firstly, keeping the moving part 1 at its normal position A, a tag 6 is placed on the tag supporting member 3 so as to have its magnetized faces directed towards the reading head 4. Then, the positions of the reading heads 4 are adjusted to correspond to and align with the magnetized faces 7 as well as to have the above described gap correspond to the thickness of the tag 6. Preparation for a record reading operation is finished thereby.

When the preparation for reading is finished as described above, the moving member 1 is moved in a direction from normal position A to the terminal position B, i.e., to a position at the side of the fixed member 2. During this movement, the reading heads 4 execute positive scanning while in contact with the magnetized faces 7 of the tag 6, thus generating an electromotive force due to the magnetic field of the magnetized faces 7. The electromotive force is transmitted to the lead-wire 8, and reading of the record will thus be completed.

As the reading device of the present invention is constructed and functions as above described, it is possible to make the device in the form of a hand type device by making it easy to grip the fixed member 2 and moving member 1 and move member 1 toward member 2. This device also has the advantage that there is no danger of misreading of the record, since the tag 6 is positively supported with respect to the fixed part 2 and the reading heads 4 contact the faces 7 opposite the tag supporting member 3 for perfect scanning along on the magnetized faces 7 of the tag 6.

The reading device of the invention has a further merit that even with the tags having two or three rows of magnetized faces, a perfect record reading can be ensured merely by a single scanning operation because it is possible to provide a a plurality of reading heads 4 on the moving member 1, and such reading heads are all adjustable in accordance with the positions of the magnetized faces of the tag 6.

What is claimed is:

1. A hand operated type reading device for reading magnetized portions of a tag, such device comprising:
   a longitudinally extending fixed member;
   a longitudinally extending moving member extending parallel to said fixed member and laterally movable from a first normal position, whereat said moving member is laterally spaced from said fixed member, to a second terminal position whereat said moving member is laterally adjacent said fixed member;
   a tag supporting member fixed to said fixed member and extending therefrom, said tag supporting member extending laterally between said fixed member and said moving member when said moving member is in said first normal position thereof, said tag supporting member being adapted to support thereon a flat tag having plural rows of magnetized faces with such faces extending transversely of said fixed member and said moving member;

mounting means for flexibly connecting said moving member to said fixed member and for urging said moving member toward said first normal position thereof; and plural reading heads mounted on said moving member, said reading heads being adjustable in the longitudinal direction of said moving member for alignment with the rows of magnetized faces of a tag adapted to be supported on said tag suppporting member, such that when said moving member is moved from said first normal position thereof to said second terminal position thereof, said reading heads will move along and read said rows of magnetized faces.

2. A device as claimed in claim 1, wherein said mounting means comprises springs extending in directions between said fixed member and said moving member, said springs having sufficient flexibility transverse to said directions to enable said moving member, when in said first normal position thereof, to move toward and away from said tag supporting member and to allow the positioning thereon of tags of varying thicknesses.

* * * * *